United States Patent
Clemm et al.

(10) Patent No.: US 10,728,130 B2
(45) Date of Patent: Jul. 28, 2020

(54) DISTRIBUTED STATELESS INFERENCE OF HOP-WISE DELAYS AND ROUND-TRIP TIME FOR INTERNET PROTOCOL TRAFFIC

(71) Applicant: Cisco Technology, Inc., San Jose, CA (US)

(72) Inventors: Alexander Clemm, Los Gatos, CA (US); Mouli Chandramouli, Bangalore (IN); Raghuram Sudhaakar, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 360 days.

(21) Appl. No.: 15/135,307

(22) Filed: Apr. 21, 2016

(65) Prior Publication Data
US 2017/0310569 A1    Oct. 26, 2017

(51) Int. Cl.
*H04L 12/26*    (2006.01)
*H04B 1/7143*    (2011.01)
(Continued)

(52) U.S. Cl.
CPC ....... *H04L 43/0864* (2013.01); *H04B 1/7143* (2013.01); *H04L 5/0055* (2013.01); *H04L 43/087* (2013.01); *H04L 43/0858* (2013.01); *H04L 43/10* (2013.01); *H04L 61/2007* (2013.01); *H04L 61/6063* (2013.01)

(58) Field of Classification Search
None
See application file for complete search history.

(56) References Cited

U.S. PATENT DOCUMENTS

2005/0177855 A1* 8/2005 Maynard ............. H04L 12/2801
                                                725/88
2007/0100907 A1* 5/2007 Bayer ....................... G06F 8/65
(Continued)

FOREIGN PATENT DOCUMENTS

WO    WO2017/184299 A1    10/2017

OTHER PUBLICATIONS

Anonymous, "Wireshark," article in Wikipedia, downloaded Sep. 1, 2016, published in United States, 5 pages.
(Continued)

*Primary Examiner* — Rebecca E Song
(74) *Attorney, Agent, or Firm* — Lee & Hayes, P.C.

(57) ABSTRACT

In an embodiment, a computer implemented method for determining network delay values comprises receiving, by a management server that is communicatively coupled via one or more networks or internetworks to a first router and a second router, two or more first timestamp values from the first router at first times at which two or more packets associated with a particular packet flow are received at the first router; receiving by the management server two or more second timestamp values from the second router at second times at which the same two or more packets associated with the same particular packet flow are received at the second router; determining one or more of: a one-way delay time in which the particular packet flow travels between the first router and the second router based on the first timestamp values and the second timestamp values; an inferred round-trip time.

20 Claims, 6 Drawing Sheets

---

RECEIVE TWO OR MORE FIRST TIMESTAMP VALUES FROM THE FIRST ROUTER AT FIRST TIMES AT WHICH TWO OR MORE PACKETS ASSOCIATED WITH A PARTICULAR PACKET FLOW ARE RECEIVED AT THE FIRST ROUTER. 210

RECEIVE TWO OR MORE SECOND TIMESTAMP VALUES FROM THE SECOND ROUTER AT SECOND TIMES AT WHICH THE SAME TWO OR MORE PACKETS ASSOCIATED WITH THE SAME PARTICULAR PACKET FLOW ARE RECEIVED AT THE SECOND ROUTER. 220

DETERMINE ONE OR MORE OF: A ONE-WAY DELAY TIME IN WHICH THE PARTICULAR PACKET FLOW TRAVELS BETWEEN THE FIRST ROUTER AND THE SECOND ROUTER BASED ON THE FIRST TIMESTAMP VALUES AND THE SECOND TIMESTAMP VALUES, AN INFERRED ROUND TRIP TIME. 230

(51) Int. Cl.
  *H04L 5/00* (2006.01)
  *H04L 29/12* (2006.01)

(56) References Cited

U.S. PATENT DOCUMENTS

| | | | | |
|---|---|---|---|---|
| 2010/0067552 | A1* | 3/2010 | Sun | H04J 3/0664 370/498 |
| 2010/0265835 | A1* | 10/2010 | Haley | H04L 12/26 370/252 |
| 2011/0313977 | A1* | 12/2011 | Al-Kateb | G01D 21/00 707/688 |
| 2015/0089045 | A1* | 3/2015 | Agarwal | H04L 43/04 709/224 |
| 2015/0163115 | A1* | 6/2015 | Martin | H04L 43/026 709/224 |
| 2015/0281028 | A1 | 10/2015 | Akhter et al. | |
| 2016/0149788 | A1* | 5/2016 | Zhang | H04L 43/10 709/224 |
| 2016/0374041 | A1* | 12/2016 | Zhang | H04B 7/269 |
| 2018/0095818 | A1* | 4/2018 | Arjun | G06F 11/0757 |

OTHER PUBLICATIONS

Anonymous, "Transmission Control Protocol" (RFC 793), USC Information Sciences Institute, Marina del Rey, California, Sep. 1981, 85 pages.
Anonymous, "tcpdump," article in Wikipedia, downloaded Sep. 1, 2016, published in United States, 3 pages.
Anonymous, "Service assurance agent," article in Wikipedia, downloaded Sep. 1, 2016, published in United States, 2 pages.
Anonymous, "Deep packet inspection," article in Wikipedia, downloaded Sep. 1, 2016, published in United States, 12 pages.
The International Bureau of WIPO, "Report on Patentability", in application No. PCT/US2017/024296, dated Oct. 23, 2018, 7 pages.
Current Claims in application No. PCT/US2017/024296, dated Oct. 2018, 5 pages.
PCT ISR dated Jul. 13, 2017 From PCT/US2017/024296.
Jan. 30, 2019 Communication of the European Publication No. EP 3,446,442 From EP 17715381.4.
Jan. 4, 2019 Notice of Publication and Entering Substantive Examination Phase From CN 201780024724.1.
PCT Written Opinion of the ISA dated Jul. 13, 2017 from WO 2017184299.

* cited by examiner

DISTRIBUTED STATELESS INFERENCE OF HOP-WISE DELAYS AND ROUND-TRIP TIME FOR INTERNET PROTOCOL TRAFFIC

TECHNICAL FIELD

The present disclosure generally relates to computer systems and methods that are programmed or configured for determining the performance of networks handling internet protocol traffic. The disclosure relates more specifically to computer-implemented techniques for inferring values for hop-wise delay and round trip time for IP traffic that traverses internetworking equipment.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Transmission Control Protocol ("TCP") is the dominant application layer protocol that is presently used in internetworking. The performance and throughput of TCP-based applications is reflected in values of connection-level metrics, such as delay, round trip time ("RTT") and packet loss. Current technology tracks TCP streams in a stateful manner and can allow an external individual or program to extract the RTT of flows. Programs such as "tcpdump" and "wireshark" may be used to tap network traffic, capture packets, organize the packets into TCP call-flows that have coordinated sets of segments such as SYN, SYN-ACK, ACK, and FIN segments; based on displays of these segments, RTT can be calculated. These packet capturing tools are often enabled at TCP end-hosts or as a bump in the wire inside the network. However, as networked systems become larger and more complex, containing many more nodes and servers, calculating RTT or hop-wise delays for all types of IP traffic becomes extremely complicated (n-squared problem) and resource-heavy since it involves maintaining the TCP state using the aforementioned methods. In particular, computing these performance metrics at line traffic speed becomes challenging.

SUMMARY

The appended claims may serve as a summary of the invention.

Figure 1:
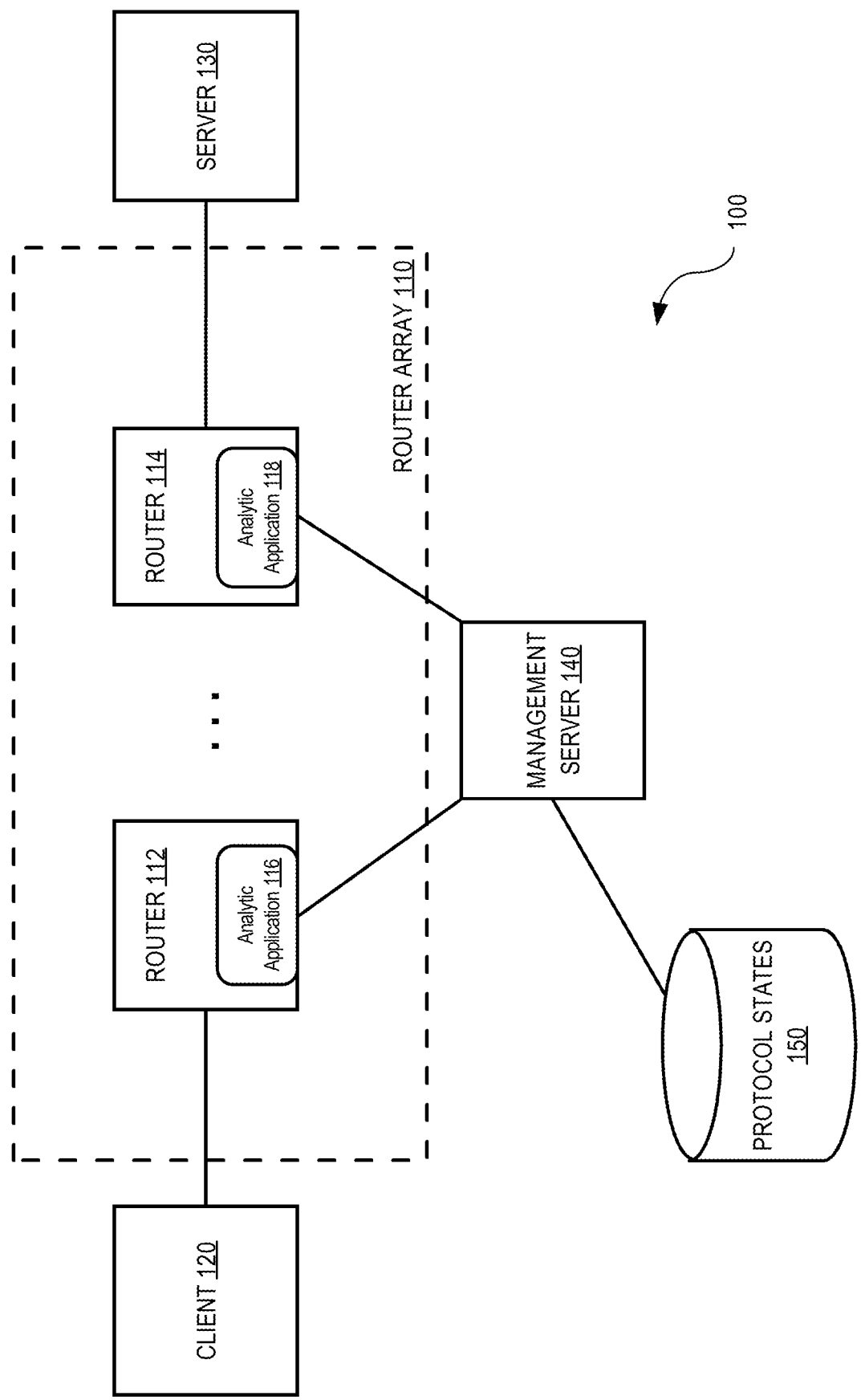
FIG. 1 illustrates an example networked environment with a plurality of internetworking devices, a client computer, a server computer, a management server computer, and a database of protocol states according to an example embodiment.

While each of the drawing figures illustrates a particular embodiment for purposes of illustrating a clear example, other embodiments may omit, add to, reorder, or modify any of the elements shown in the drawing figures. For purposes of illustrating clear examples, one or more figures may be described with reference to one or more other figures, but using the particular arrangement illustrated in the one or more other figures is not required in other embodiments. For example, client 120, router 112, router 114, and server 130 in FIG. 1 may be described with reference to several steps in FIG. 2 and discussed in detail below, but using the particular arrangement illustrated in FIG. 1 is not required in other embodiments.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. Furthermore, words, such as "or," may be inclusive or exclusive unless expressly stated otherwise.

Embodiments are described herein according to the following outline:

1.0 General Overview
   2.0 Example Network Topology for Determining Hop-Wise Delay and Round Trip Time for IP Traffic
   3.0 Process for Determining Hop-Wise Delay and Round Trip Time for IP Traffic
      3.1 Increasing the Resolution of One-Way Delay Time for IP Traffic
      3.2 Updating One-Way Delay Time for IP Traffic
      3.3 Determining Overall One-Way Delay and Round Trip Time
      3.4 Benefits of Certain Embodiments
   4.0 Implementation Mechanisms—Hardware Overview
   5.0 Other Aspects of Disclosure
   1.0 General Overview Systems and methods are discussed herein for determining hop-wise delays and round trip time for IP traffic. In one embodiment, a computer implemented method for determining network delay values comprises receiving, by a management server that is communicatively coupled via one or more networks or internetworks to a first router and a second router, two or more first timestamp values from the first router at first times at which two or more packets associated with a particular packet flow are received at the first router; receiving by the management server two or more second timestamp values from the second router at second times at which the same two or more packets associated with the same particular packet flow are received at the second router; determining one or more of: a one-way delay time in which the particular packet flow travels between the first router and the second router based on the first timestamp values and the second timestamp values; an inferred round-trip time.

In another embodiment, a computer implemented method for determining network delay values comprises downloading, from a file server computer to a first router, a second router and a management server, which are communicatively coupled via one or more networks or internetworks, a digital electronic file of programmed instructions which when executed by the first router, second router and management server cause performing: sending, from a first router to a management server that is communicatively coupled via one or more networks or internetworks to the first router and a second data router, two or more first timestamp values at first times at which two or more packets associated with a particular packet flow are received at the first router; sending, from the second router to the management server, two or more second timestamp values at second times at which the same two or more packets associated with the same particular packet flow are received at the second router; by the management server, determining one or more of: a one-way delay time in which the particular packet flow travels between the first router and the second router based on the first timestamp values and the second timestamp values; an inferred round-trip time; receiving, by the file server computer, acknowledgment messages specifying that the first router, second router and management server installed the digital electronic file.

In some approaches, techniques to calculate the RTT of a TCP flow are implemented using TCP protocol software, and the TCP stack can use the RTT values to change processing depending on network conditions. Certain deep packet inspection mechanisms have been programmed to track TCP streams in a stateful manner and to calculate the RTT of the flows. Open source programs such as "wireshark" and "tcpdump" also allow a user to capture the TCP packets at TCP end-hosts and it is possible to calculate the RTT of TCP flows. However, it is important to note that these techniques cannot scale to measure the TCP level performance metrics at line traffic rate. Moreover, these technologies do not determine RTT values or inferred hop-wise delays in the manner described herein.

IP service level agreements (SLAs) and SLA enforcement software have been programmed to track IP service levels, for example, in Cisco IOS Software. SLA code can allow administrators the ability to analyze IP service levels for IP applications and services, and typically use active traffic-monitoring logic to monitor continuous traffic on the network. This permits measuring overhead as a factor in network performance. Cisco routers, for example, provide IP SLA probes and IP SLA responders that can measure data across a network. However, this technique does not lend itself to track delays incurred by TCP streams in the data plane, or to calculate hop-wise delays.

2.0 Example Network Topology for Determining Hop-Wise Delay and Round Trip Time for IP Traffic FIG. 1 illustrates an example networked environment with a plurality of network devices, a client computer, a server computer, a management server computer, and a database of protocol states according to an example embodiment. In FIG. 1, system 100 comprises client computer 120, server computer 130, management server computer 140, protocol states 150, router 112, and router 114, collectively referred to herein as router array 110. Client computer 120 is operatively coupled to router 112 over one or more computer networks. Server computer 130 is operatively coupled to router 114 over one or more computer networks. Router 112 and router 114 are operatively coupled to management server computer 140 over one or more computer networks and operatively coupled to each other either directly or indirectly through a number of non-pictured routers. Router 112, 114 respectively execute analytic application 116 and analytic application 118.

Analytic application 116 and analytic application 118 can also be run in a virtual machine on their respective routers. For example, in one embodiment, analytic applications 116, 118 may be implemented using the Data in Motion (DMO) analytics engine, which is commercially available from Cisco Systems, Inc., San Jose, Calif. The DMO analytics engine has been programmed to filter TCP traffic to a particular destination based upon the server IP address for example, and to send filtered packets to a controller. DMO also has the capability to track TCP flows independently in each direction. In an embodiment, as further described herein, each DMO instance will track all TCP streams starting from the SYN, SYN-ACK, ACK packets to the FIN, FIN-ACK packets, and each DMO instance will report the timestamp at which the SYN and SYN-ACK were received, creating the initial reference point for the controller to calculate the delays being encountered by the stream. Each DMO instance will also periodically report a timestamp to the controller based on the number of bytes transmitted on the TCP stream.

Protocol states 150 can be maintained in a separate database that is operatively coupled to management server computer 140, or maintained directly by management server computer 140.

For purposes of illustrating a clear example, client computer 120 is labeled as a computer and router 112, 114 are labeled as routers; however, router 112, 114 each may be a different type of internetworking apparatus, or a computer. A "computer" may be one or more physical computers, virtual computers, or computing devices. As an example, a computer may be one or more server computers, cloud-based computers, cloud-based cluster of computers, virtual machine instances or virtual machine computing elements such as virtual processors, storage and memory, data centers, storage devices, routers, hubs, switches, desktop computers, laptop computers, mobile devices, or any other special-purpose computing devices. Any reference to "a computer" herein may mean one or more computers, unless expressly stated otherwise and any reference to a "router" can mean any element of internetworking gear.

Additionally, for purposes of illustrating a clear example, router 112 is depicted as directly communicating with client 120, so it is a first hop network device to client 120, and router 114 is depicted as directly communicating with server 130, which is the network exit towards server 130. However, both routers 112, 114 can have one or more other routers or other intermediary devices through which a data stream must pass before reaching either client 120 or server 130.

The amount of time that elapses when a data stream passes from router 112 to router 114 is often measured on the order of milliseconds. Therefore, in an embodiment, analytic applications 116, 118 are time synchronized. Time synchronization can be implemented by synchronizing the analytic applications 116, 118 with a Network Time Protocol (NTP) server and periodically resynchronizing to reduce deviations and to record any such deviations for management server 140 to more accurately gauge network performance. In other embodiments, different clock synchronization protocols can be used and the particular protocol used for achieving time synchronization is not critical. In one embodiment, the timestamp values are epoch numbers, and resolution and jitter errors can be controlled via NTP to allow the errors in calculations at the management server computer 140 to remain within a few tens of milliseconds.

While each of the components listed above is illustrated as if running on a separate, remote computer from each other, one or more of the components listed above may be part of or executed on the same computer. For example, management server computer 140 and protocol states 150 may be two software applications that are executed on the same computer. In an embodiment, management server 140 is programmed using one or more computer programs, other software elements, or other functional logic to perform the operations that are further described herein in connection with the flow diagrams.

3.0 Process for Determining Hop-Wise Delays and Round Trip Time for IP Traffic

Routers 112, 114 comprise two or more routers in the network path along which data flows between client 120 and server 130. Router 112 is the first network device that data from client 120 reaches on the way to server 130. Router 114 is the last network device after which data exits the network path and continues to server 130. As a data stream flows between client 120 and server 130 through routers 112, 114, analytic applications 116, 118 work in conjunction with management server 140 to determine hop-wise delays and inferred round trip times for the data stream along that particular network path.

Figure 2:
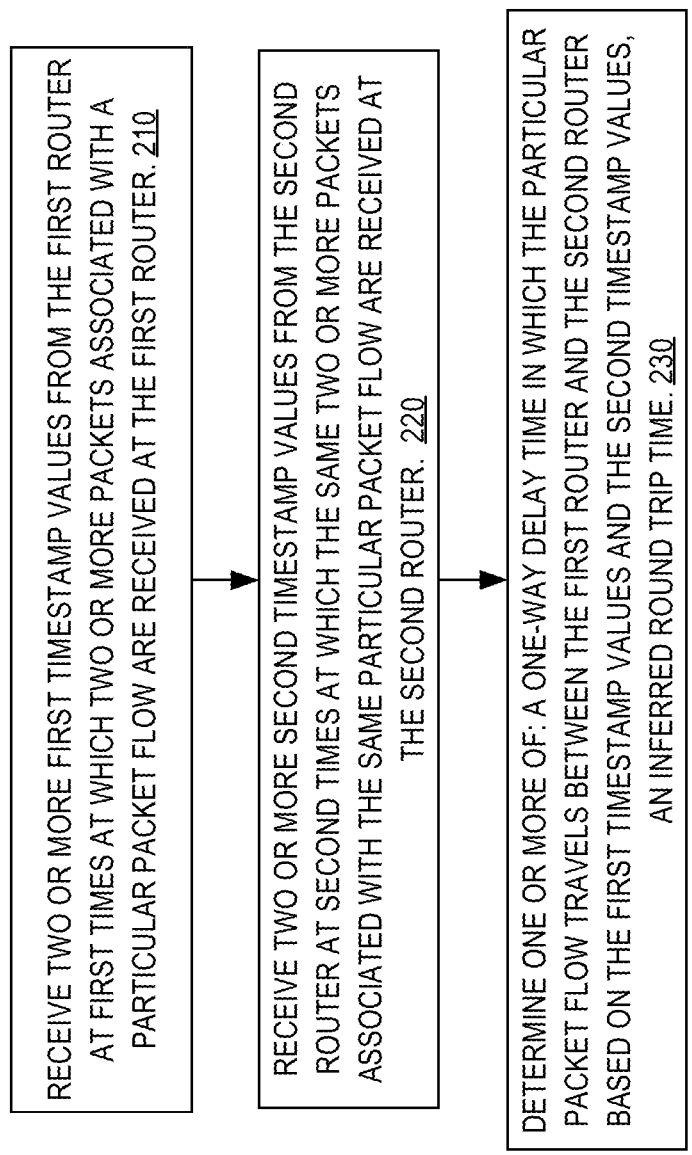
FIG. 2 illustrates a process for determining one or more of a one-way delay time and inferred round trip time of a data stream through a router array.
Figure 4:
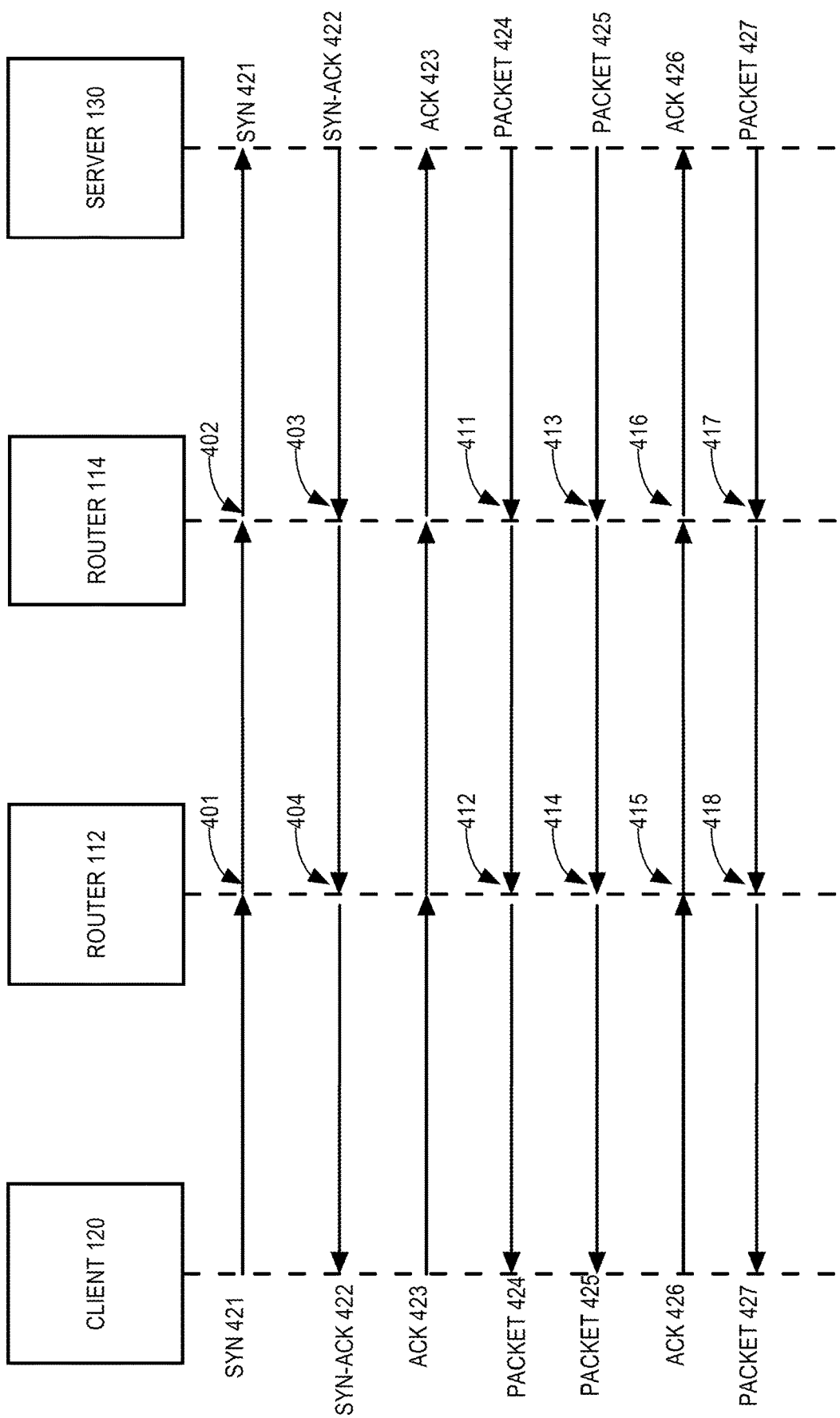
FIG. 4 illustrates an example data stream between a client computer and a server computer through a first router and a second router and example associated timestamping.

FIG. 2 illustrates a process when performed on the example data stream of FIG. 4 on the example network of FIG. 1 for inferring the one-way delay and round trip times in a distributed stateless manner. FIG. 2, and each other flow diagram in this disclosure, is intended as an example of a programmable algorithm that may be implemented using one or more of the management server 140 under control of one or more computer programs that are configured to execute the operations that are described in connection with the flow diagrams. The programs may be created using any computer program development environment that is now known or contemplated at the time of this writing, including but not limited to JAVA, C++, OBJECTIVE-C, C, C #, PASCAL, alone or in combination with scripting languages such as PERL, JAVASCRIPT, Python, PHP, Ruby and the like.

In step 210, management server 140 receives two or more first timestamp values from router 112. These first timestamp values indicate first times at which two or more packets associated with a particular packet flow are received at router 112. In step 220, management server 140 receives two or more second timestamp values from router 114. These second timestamp values indicated second times at which the same two or more packets associated with the same particular packet flow received by router 112 are received at router 114.

A data stream between the client 120 and the server 130 consists of multiple packets. In an embodiment, as two or more particular packets are received, the router 112, 114 create and store values for the time at which each received the two or more particular packets, as two or more timestamp values. The timestamp values are received by management server 140, for use to determine one-way delay and round trip time for the data stream.

In an embodiment, the two or more packets associated with the particular packet flow comprise a SYN segment and a SYN-ACK segment in a three-way TCP handshake exchange between server 130 and client 120, followed by substantive data segments in the same flow. However, other embodiments may be implemented for analysis of packets or other datagrams that are formatted for other protocols.

FIG. 4 depicts an example data stream with which hop-wise delays and round trip time of the network depicted in FIG. 1 can be determined. For purposes of illustrating a clear example, assume that the process described thus far has received data sufficient to analyze and process the data stream depicted in FIG. 4. This data stream is an example transmission of data pursuant to TCP standards, but the embodiment of FIG. 1 or other embodiments may be programmed to analyze other types of data streams using processes similar to the methods disclosed herein.

SYN 421, ACK 423, and ACK 426 comprise TCP segments that are sent from client 120 to server 130 through router 112, 114 as indicated by the arrows pointing from client 120 through router 112, 114 to server 130. SYN-ACK 422, PACKET 424, PACKET 425, and PACKET 427 are segments and packets that are sent from server 130 to client 120 through router 114 and router 112, also indicated by the arrows pointing from server 130 through router 114 and router 112 to client 120.

Timestamps 401-404 and timestamps 411-418 represent values of the times at which routers 112, 114 receive each data segment or packet. Specifically, timestamp 401 is when router 112 received SYN 421, and timestamp 402 is when router 114 received SYN 421. Timestamp 403 is when router 114 receives SYN-ACK 422, and timestamp 404 is when router 112 receives SYN-ACK 422. Timestamp 411 is when router 114 receives PACKET 424, and timestamp 412 is when router 112 receives PACKET 424. Timestamp 413 is when router 114 receives PACKET 425, and timestamp 414 is when router 112 receives PACKET 425. Timestamp 415 is when router 112 received ACK 426, and timestamp 416 is when router 114 received ACK 426. Timestamp 417 is when router 114 receives PACKET 427, and timestamp 418 is when router 112 receives PACKET 427.

Embodiments presume that timestamp values of the type identified above can be generated at the internetworking apparatus, such as routers 112, 114, and then are available to the management server 140. The specific mechanism for adding such timestamps is not critical and may be an inherent part of the internetworking operating system that executes on the routers 112, 114, or may be implemented using a custom agent such as applications 116, 118.

In this example, client 120 and server 130 perform a three-way TCP handshake exchange as follows. Client 120 sends SYN segment 421 to server 130, receives SYN-ACK 422 segment from server 130, and sends ACK 423 segment to server 130. In doing so, each segment passes through router 112, 114 upon transmission from client 120 to server 130 and back.

Management server 140 receives timestamp values from routers 112, 114 with which to calculate one-way delay and round trip times for the data stream, as in the following example. Management server 140 receives timestamp 401 indicating the time when router 112 received SYN segment 421. Management server 140 also receives timestamp 402 indicating the time when router 114 received SYN segment 421. Management server 140 then receives timestamp 403 indicating the time when router 114 received SYN-ACK segment 422 and timestamp 404 from router 112 indicating the time when router 112 received SYN-ACK segment 422.

The analytic applications 116, 118 in routers 112, 114, respectively, are programmed to identify the packets for which the applications should send timestamps upon receipt of instructions from management server 140 and protocol states 150. In an embodiment, protocol states 150 comprises a data store that describes the types of packets routers 112, 114 should expect, such as SYN, SYN-ACK, and ACK segments in the three-way TCP handshake. Protocol states 150 can also contain start values and/or end values to monitor, and which indicate the bounds of data streams. For example, protocol states 150 may contain instructions for router 112, router 112, 114114 to begin tracking all TCP streams starting from the SYN, SYN-ACK, and ACK packets to the FIN, FIN-ACK packets and sending timestamps for when router 112, 114 receives each packet.

In another embodiment, the two or more packets associated with the particular packet flow are filtered by analytic application 116 of router 112 and analytic application 118 of router 114 from one or more other packets that do not have timestamps recorded by either router 112 or router 114.

For example, assume the data stream is a video stream. Management server 140 could receive a first timestamp value representing the time when router 112 received bit 0 of the video stream and another first timestamp value representing the time when router 112 received bit 100 of the video stream. Management server 140 may be programmed to receive a second timestamp value representing a time when router 114 received bit 0 of the video stream and another second timestamp value representing when router 114 received bit 100 of the video stream.

In step 230, management server 140 determines one or more of a one-way delay time in which the particular packet flow travels between router 112, 114 and an inferred round trip time.

The one-way delay time is determined based on the first timestamp values and the second timestamp values. For example, as depicted in FIG. 4 and discussed above, management server 140 has received timestamp 401 and timestamp 404 from router 112 and timestamp 402 and timestamp 403 from router 114. In an embodiment, management server 140 determines a one-way delay time in which the particular packet flow travels between router 112, 114 based on the difference between timestamp 402 and timestamp 401 and the difference between timestamp 404 and timestamp 403.

In another embodiment, management server 140 determines an inferred round trip time from the difference between timestamp 403 and timestamp 402. The management server 140 may be programmed to determine an inferred round trip time for the example flow of FIG. 4 by calculating timestamp 415—timestamp 414. This inferred round trip time is different from a true round trip time because this inferred round trip time does not involved the delay between server 130 and router 114.

3.1 Increasing Precision of One-Way Delay Values

While FIG. 1 only depicts two routers 112, 114, the number of routers can be increased, which will improve the precision of the one-way delay values that result from the foregoing computations. In other words, by increasing the number of routers with the analytic applications deployed in runtime, the system can achieve more precise measurement of one-way delay values. Based on the location of the routers 112, 114, the management server 140 can monitor the timestamps received from various parts of the data flow and provide performance data indicating how delay values are different at each hop of each flow. These measurements may be used to identify hop-wise delays.

For example, assume that a network consists of client C and server S, separated by routers A, B, D, so that the network topology in simplified schematic terms is: C-A-B-D-S. The techniques herein may be used to determine one-way delay from S to D, from S to B, and from S to A. Then, subtracting the one-way delay value (S to B) from (S to D) yields the hopwise delay (D to B). That is, by computing differences among each of the individual one-way delay values that represents one-way delay with respect to a particular router, delay values for transmission of packets between individual routers can be determined, without the use of special protocols, and without installing agents on all the routers. Instead, in an elegant improvement that the inventors conceived in an inventive moment, if the management server 140 can receive packets with timestamp values in the manner that has been described, multiple different kinds of one-way delay values can be determined. This approach would provide stronger and more precise network correlations, allowing for identification and diagnoses of network bottlenecks.

3.2 Updating One-Way Delay Time for IP Traffic

Figure 3:
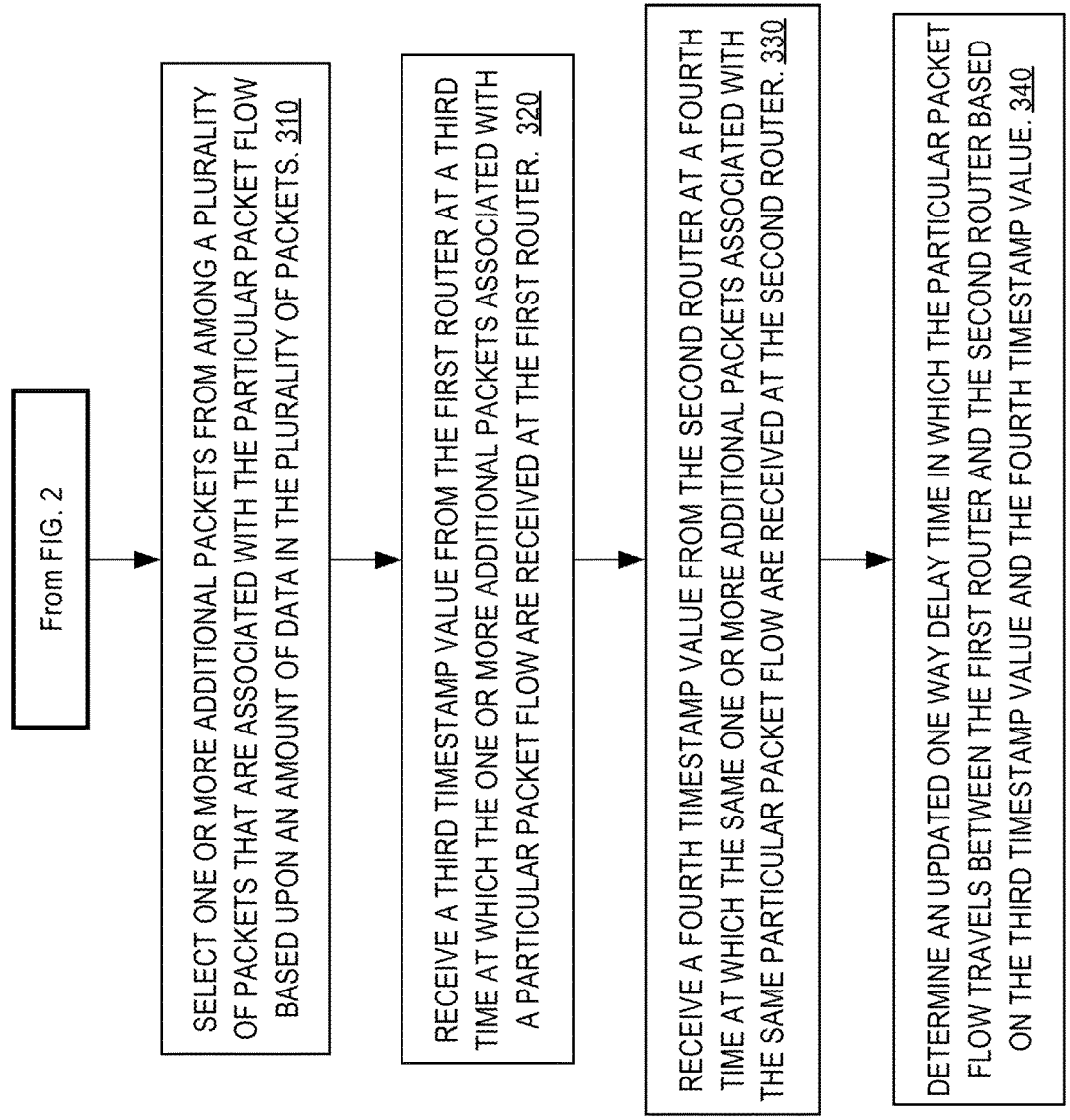
FIG. 3 illustrates a process for determining an updated one-way delay time of a data stream through a router array.

After determining one or more of a one-way delay time in which a particular packet flow travels between router 112, 114 and an inferred round trip time, it may be necessary to continue to monitor the performance of the network path. FIG. 3 illustrates a process which determines updated one-way delay and round trip times, when performed in addition to the steps of FIG. 2.

In step 310, management server 140 selects one or more additional packets from among a plurality of packets that are associated with the particular packet flow based upon an amount of data in the plurality of packets.

For example, after a TCP stream has begun and management server 140 determines an initial one-way delay time, it can continue to update its analysis of the network's performance by selecting packets sent in the data flow. The management server can instruct router 112, 114 to send timestamps for every packet, or every number of packets depending on the amount of data in the plurality of packet. The variance in the frequency of reports is to prevent substantial performance impacts due to the monitoring of the system and can be adjusted dynamically or be preset.

In step 320, management server 140 receives a third timestamp value from router 112 at a third time at which the one or more additional packets associated with a particular packet flow are received at router 112.

In step 330, management server 140 receives a fourth timestamp value from router 114 at a fourth time at which the same one or more additional packets associated with the same particular packet flow are received at router 114.

In step 340, management server 140 determines an updated one-way delay time in which the particular packet flow travels between the router 112, 114 based on the third timestamp value and the fourth timestamp value. In doing so, management server 140 can continue to provide performance data of the data flow based on timestamps received from router 112, 114.

3.3 Determining One-Way Network Delay

Figure 5:
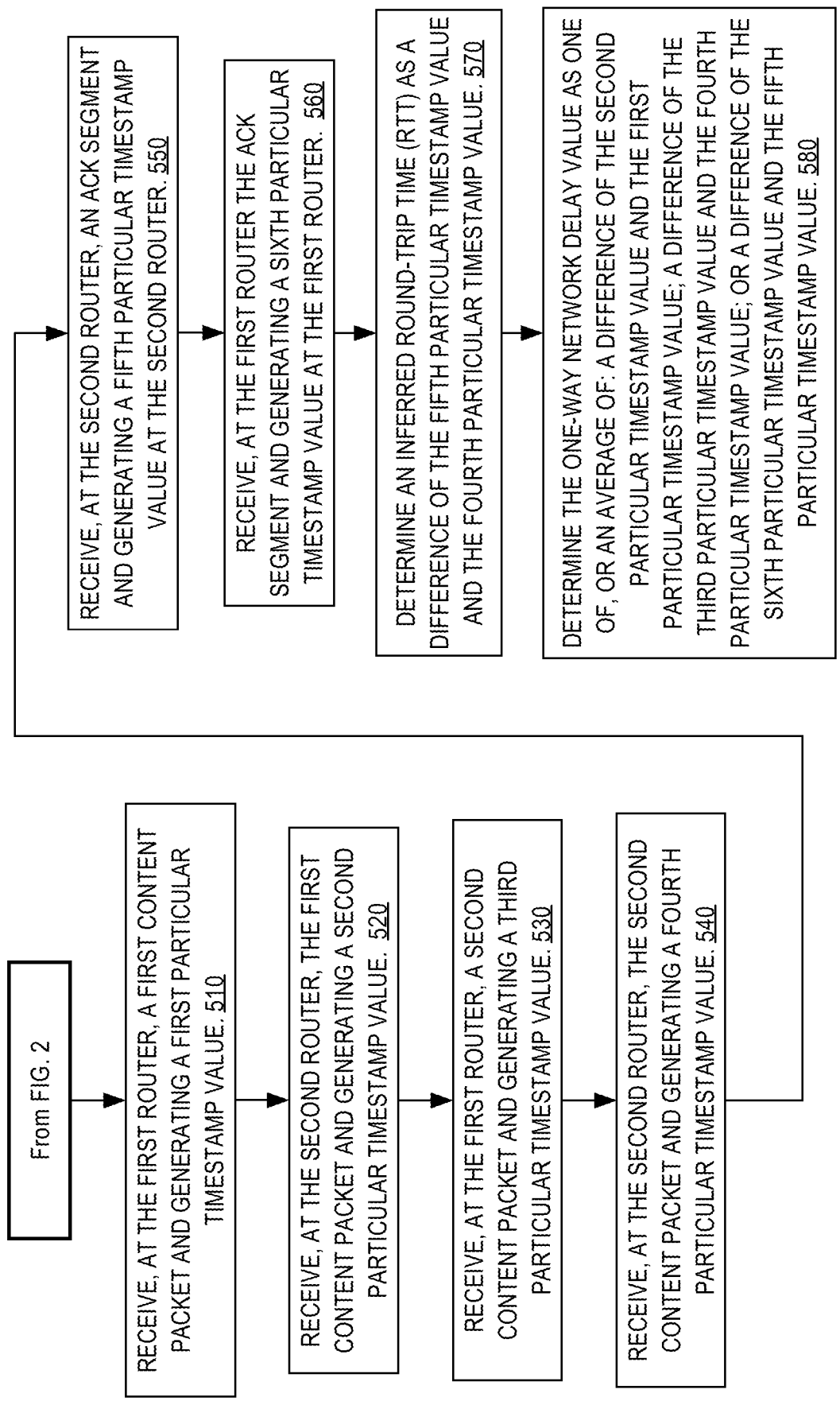
FIG. 5 illustrates a process for determining one-way network delay.

Additional packets, including packets flowing in each direction, are recorded to determine one-way network delay. FIG. 5 illustrates a process for determining one-way network delays which may be performed on the data stream depicted in FIG. 4 in addition to steps of FIG. 2.

In step 510, router 114 receives a first content packet and generates a first particular timestamp value. In the example data stream depicted in FIG. 4, router 114 would generate timestamp value 411 in response to receiving first content packet 424.

In step 520, router 112 receives the first content packet and generates a second particular timestamp value. In the example data stream depicted in FIG. 4, router 112 would generate timestamp value 412 in response to receiving first content packet 424.

In step 530, router 114 receives a second content packet and generates a third particular timestamp value. In the example data stream depicted in FIG. 4, router 114 would generate timestamp value 413 in response to receiving second content packet 425.

In step 540, router 112 receives the second content packet and generates a fourth particular timestamp value. In the example data stream depicted in FIG. 4, router 112 would generate timestamp value 414 in response to receiving second content packet 425.

In step 550, router 112 receives an ACK segment and generates a fifth particular timestamp value. In the example data stream depicted in FIG. 4, router 112 would generate timestamp value 415 in response to receiving ACK segment 426.

In step 560, router 114 receives the ACK segment and generates a sixth particular timestamp value. In the example data stream depicted in FIG. 4, router 113 would generate timestamp value 416 in response to receiving ACK segment 426.

In step 570, management server 140 determines an inferred round-trip time as a difference of the fifth particular timestamp value and the fourth particular timestamp value. In the example data stream depicted in FIG. 4, management server 140 determines an inferred round-trip time as the difference of timestamp value 415 and timestamp value 414.

In an embodiment, during transmission of other packets that are sent back and forth after the three-part TCP handshake, the management server 140 may be programmed to calculate a round-trip time. Neither packet 424 nor packet 427 elicits a response from the client in the form of ACK segments. Therefore, management server 140 receives timestamp 415 from router 112 and only then determines an inferred round-trip time, between the time that the router 112 receives packet 425 and forwards it toward client 120 and the time that router 112 receives ACK 426 from client 120.

In step 580, management server 140 determines a one-way network delay value as one of, or an average of:
  a difference of the second particular timestamp value and the first particular timestamp value;
  a difference of the third particular timestamp value and the fourth particular timestamp value; or
  the difference of the sixth particular timestamp value and the fifth particular timestamp value.
In the example data stream depicted in FIG. 4, management server 140 determines the one-way network delay value as one of, or an average of:
  a difference of timestamp 412 and timestamp 411;
  a difference of timestamp 413 and timestamp 414; or
  a difference of timestamp 416 and 415.

3.4 Selected Benefits of Embodiments

The disclosure has described a relatively lightweight mechanism to estimate RTT values in complex internetworks. In one respect, a distributed stateless mechanism for inferring round trip time based on bi-directional filtering technique is disclosed. Embodiments also may be programmed to calculate delays that each stream is encountering between multiple routers in a path. For example, the management server 140 may be programmed to measure the RTT between endpoints as an average of all flows between them, which provides a much better estimate of network conditions than with just one flow. Most applications hosted above TCP now use multiple TCP flows, so the techniques herein can provide significantly improved feedback to such applications.

Embodiments can dynamically scale the resolution of the hop-wise delays by increasing the number of taps, that is, routers on which DMO instances or other agents are deployed in runtime, which provide measurements to the controller.

Embodiments can be programmed to show a runtime graph of how delays are varying at each hop for each flow. This approach provides an additional opportunity for network correlation to allow identification of network bottlenecks, providing significant improvements in how network administrators can understand and diagnose problems encountered by applications due to network delays.

Additionally, the distributed and stateless nature of the mechanism allows it to be run on a heterogeneous range of devices, from low end routers to high capacity multi-gigabit routers.

4.0 Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
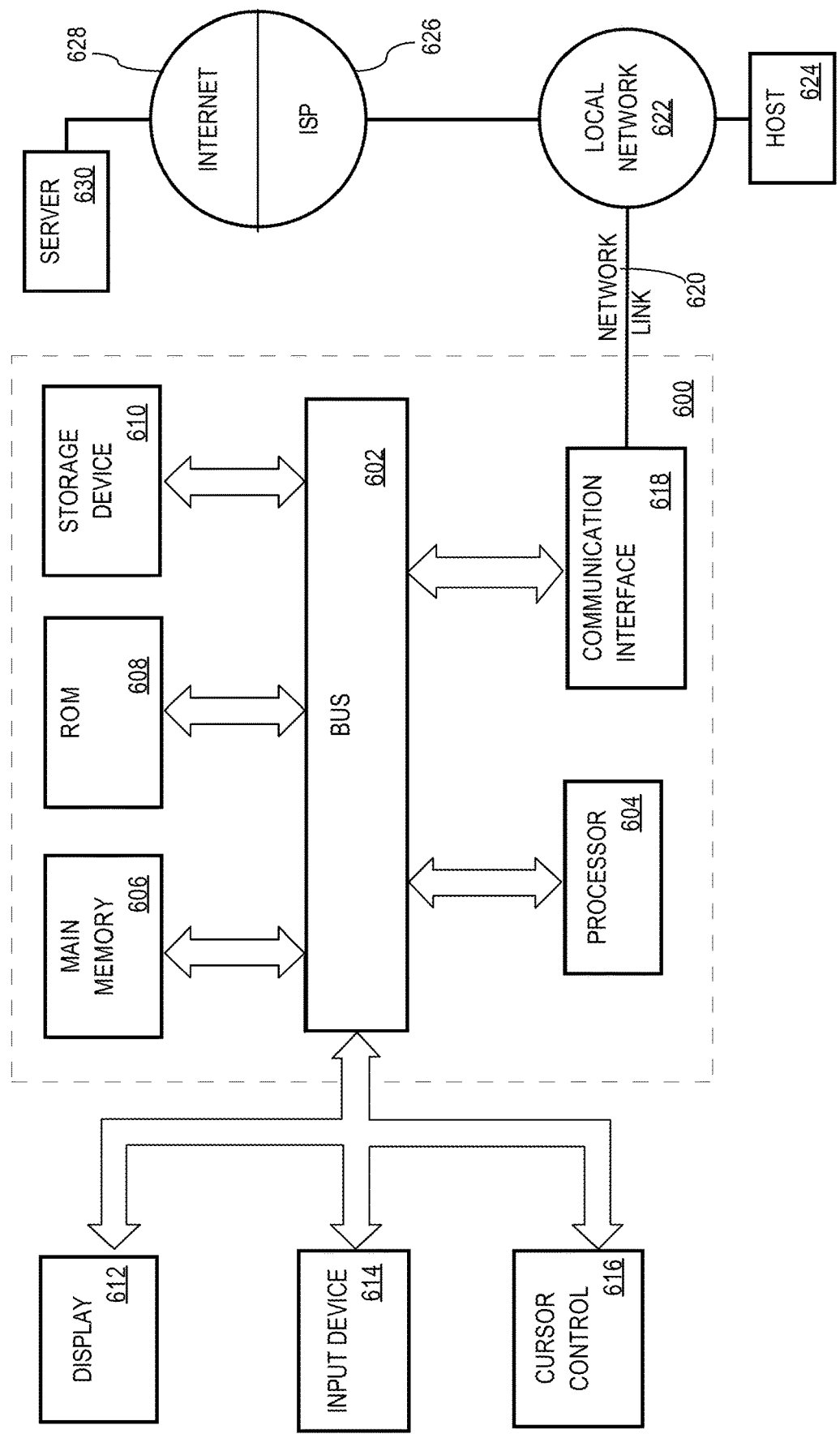
FIG. 6 illustrates a computer system upon which an embodiment of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main-memory 606, such as a random access memory (RAM) or other dynamic storage device, coupled to bus 602 for storing information and instructions to be executed by processor 604. Main-memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main-memory 606. Such instructions may be read into main-memory 606 from another storage medium, such as storage device 610. Execution of the sequences of instructions contained in main-memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main-memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main-memory 606, from which processor 604 retrieves and executes the instructions. The instructions received by main-memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server computer 630 might transmit a requested code for an application program through Internet 628, ISP 626, local network 622 and communication interface 618.

The received code may be executed by processor 604 as it is received, and/or stored in storage device 610, or other non-volatile storage for later execution.

5.0 Other Aspects of Disclosure

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer implemented method for determining network delay values, the computer implemented method comprising:
receiving, by a management server that is communicatively coupled via one or more networks to a first router and a second router:
a first timestamp value from the first router relating to a first packet arriving at the first router, the first packet associated with a particular packet flow flowing in a first direction from the first router to the second router, and
another first timestamp value from the first router relating to a second packet arriving at the first router, the second packet associated with the particular packet flow flowing in the first direction from the first router to the second router;
receiving, by the management server:
a second timestamp value from the second router relating to the first packet arriving at the second router in the particular packet flow flowing in the first direction, and
another second timestamp value from the second router relating to the second packet arriving at the second router in the particular packet flow flowing in the first direction;
calculating a difference between the first timestamp value and the second timestamp value;

calculating another difference between the another first timestamp value and the another second timestamp value;

based upon an average of at least the difference and the another difference, determining a one-way delay time associated with the particular packet flow traveling between the first router and the second router;

instructing the first router and the second router to dynamically adjust an amount of additional timestamp values associated with the particular packet flow that are sent to the management server based at least in part upon an amount of data in the particular packet flow; and updating the one-way delay time based at least in part on the additional timestamp values.

2. The computer implemented method of claim 1, wherein the instructing the first router and the second router to dynamically adjust the amount of additional timestamp values comprises instructing the first router and the second router to change a number between the packets of the packet flow for which the additional timestamp values are sent to the management server.

3. The computer implemented method of claim 1, wherein the updating the one-way delay time based at least in part on the additional timestamp values comprises:

receiving, by the management server:
   an additional first timestamp value from the first router relating to an additional packet arriving at the first router, and
   an additional second timestamp value from the second router relating to the additional packet arriving at the second router;

calculating an additional difference between the additional first timestamp value and the additional second timestamp value; and updating the one-way delay time based at least in part upon the calculated additional difference.

4. The method of claim 1, wherein the first router is a first hop from a client computer and the second router is another first hop from a server computer.

5. The computer implemented method of claim 1, further comprising:

resolving, by the management server, one or more clock jitter time synchronization errors among the first timestamp value, the another first timestamp value, the second timestamp value, and the another second timestamp value.

6. The computer implemented method of claim 1, further comprising:

receiving, by the management server from the second router, an ACK segment arrival timestamp value relating to an ACK segment of the particular packet flow, the ACK segment arriving at the second router subsequent to the second packet arriving at the second router;

determining an inferred round-trip time (RTT) as a difference between the another second timestamp value and the ACK segment arrival timestamp value, the inferred RTT relating to a network path from the second router to another device and back to the second router.

7. A method comprising:

receiving, by a management server that is communicatively coupled via at least one network to a first router and a second router:

first timestamp values from the first router relating to a first packet arriving at the first router and a second packet arriving at the first router, the first packet and the second packet associated with a particular packet flow flowing from the first router to the second router, and second timestamp values from the second router relating to the first packet arriving at the second router and the second packet arriving at the second router in the particular packet flow flowing from the first router to the second router;

calculating differences between the first timestamp values and the second timestamp values;

based at least in part upon the calculated differences, determining a one-way delay time of a network path over which the particular packet flow travels between the first router and the second router;

instructing the first router and the second router to dynamically adjust an amount of additional timestamp values associated with the particular packet flow that are sent to the management server based at least in part upon an amount of data in the particular packet flow; and updating the one-way delay time based at least in part on the additional timestamp values.

8. The method of claim 7, wherein the instructing the first router and the second router to dynamically adjust the amount of additional timestamp values comprises instructing the first router and the second router to change a percentage of the packets of the packet flow for which the additional timestamp values are sent to the management server.

9. The method of claim 7, further comprising:
instructing the first router to send the first timestamp values for the first packet and the second packet based at least in part on an amount of data in the particular packet flow.

10. The method of claim 7, further comprising:
calculating additional hopwise delay times associated with additional routers along the network path based at least in part on the calculated differences.

11. The method of claim 7, wherein the first timestamp values are received by the management server from a first filter unit in the first router, wherein the first filter unit is programmed to filter the first packet and the second packet from the particular packet flow for sending to the management server, the filtering based at least in part upon unidirectional transmission control protocol (TCP) flow parameter values.

12. The method of claim 7, further comprising:
instructing the first router to select the first packet and the second packet for sending the first timestamps based at least in part upon a preset variance in frequency of reports.

13. A computing device comprising:
one or more processors; and
one or more non-transitory storage media storing executable instructions that, when executed by the one or more processors, cause the one or more processors to:
receive, from a first router, first timestamp values relating to a first packet and a second packet arriving at the first router in a particular packet flow flowing from the first router to a second router along a network path;
receive, from the second router, second timestamp values relating to the first packet and the second packet arriving at the second router in the particular packet flow;
calculate differences between the first timestamp values and the second timestamp values; and based at least in part upon the calculated differences, determine a one-way delay time associated with the network path;

instruct the first router and the second router to dynamically adjust an amount of additional timestamp values associated with the particular packet flow that are sent to the computing device based at least in part upon an amount of data in the particular packet flow; and update the one-way delay time based at least in part on the additional timestamp values.

14. The computing device of claim 13, wherein the calculated differences include:

a first difference between an individual first timestamp value related to the first packet and an individual second timestamp value related to the first packet; and a second difference between another individual first timestamp value related to the second packet and another individual second timestamp value related to the second packet.

15. The computing device of claim 14, wherein the executable instructions further cause the one or more processors to:

determine the one-way delay time associated with the network path based at least in part upon an average of the first difference and the second difference.

16. The computing device of claim 13, wherein updating the one-way delay time based at least in part on the additional timestamp values comprises:

receiving, from the first router, additional first timestamp values relating to an additional packet arriving at the first router in the particular packet flow flowing from the first router to a second router along the network path;

receiving, from the second router, additional second timestamp values relating to the additional packet arriving at the second router in the particular packet flow; and updating the one-way delay time associated with the network path based at least in part upon the additional first timestamp values and additional second timestamp values.

17. The computing device of claim 13, wherein the executable instructions further cause the one or more processors to:

receive, from additional routers in between the first router and the second router in the network path, further additional timestamp values; and based at least in part upon the calculated differences and the further additional timestamp values, determine hopwise delays along the network path among the first router, the additional routers, and the second router.

18. The computing device of claim 13, wherein the executable instructions further cause the one or more processors to:

receiving, by the management server from the second router, a third timestamp value relating to a segment received at the second router after the second packet;

determining an inferred round-trip time (RTT) based at least in part upon a difference between the third timestamp value and an individual second timestamp value of the second timestamp values, the individual second timestamp value relating to the second packet arriving at the second router.

19. The computing device of claim 18, wherein the segment is received at the second router from a different direction along the network than the second packet.

20. The computing device of claim 18, wherein the executable instructions further cause the one or more processors to:

determine an overall RTT for the second router based at least in part on the inferred RTT round-trip and additional inferred RTTs calculated from subsequent timestamp values.

* * * * *